United States Patent [19]

Pickering et al.

[11] Patent Number: 4,898,405

[45] Date of Patent: Feb. 6, 1990

[54] BINDABLE COVER FOLDERS

[75] Inventors: J. H. Pickering, Wayland; Sushil K. Bhatia, Framingham, both of Mass.; Roger Chevrette, Woonsocket, R.I.

[73] Assignee: Dennison Manufacturing Company, Framingham, Mass.

[21] Appl. No.: 239,455

[22] Filed: Sep. 1, 1988

[51] Int. Cl.[4] .......................... B42D 3/00; B42D 3/12; B42C 9/00; B32B 3/04

[52] U.S. Cl. .......................................... 281/29; 281/48; 412/8; 156/216

[58] Field of Search ........................ 281/29, 45, 46, 48, 281/49, 21 R; 412/8, 27, 30, 37; 156/216, 546

[56] References Cited

U.S. PATENT DOCUMENTS

| | | | |
|---|---|---|---|
| 3,485,564 | 12/1969 | Holes et al. | 402/13 |
| 4,129,471 | 12/1978 | Rome | 156/216 |
| 4,213,220 | 7/1980 | Lopez-Martinez | 412/8 |
| 4,441,950 | 4/1984 | Lolli | 156/216 |
| 4,486,032 | 12/1984 | Leahy | 281/45 |
| 4,575,123 | 3/1986 | Giblim et al. | 281/48 |
| 4,673,324 | 6/1987 | Hanson et al. | 412/8 |
| 4,750,956 | 6/1988 | Malachowski | 412/8 |
| 4,762,341 | 8/1988 | Rabuse | 412/8 |
| 4,793,758 | 12/1988 | Hanson et al. | 281/29 |

*Primary Examiner*—Douglas D. Watts
*Assistant Examiner*—Paul M. Heyrana, Sr.
*Attorney, Agent, or Firm*—Barry D. Josephs

[57] ABSTRACT

Cover folders for permanently binding a stack of paper sheets without the use of fasteners. The cover folder has a binder spline which contains a quick drying adhesive which is protected by a removable protective film. The film is removed just prior to use to expose the adhesive. The cover folder allows for quick permanent binding of the stack of paper sheets which are pressed into contact with the adhesive. In alternative embodiments the adhesive may be applied directly to the binder spline from a dispenser and the stack of sheets then inserted in the spline.

2 Claims, 5 Drawing Sheets

FIG. 4
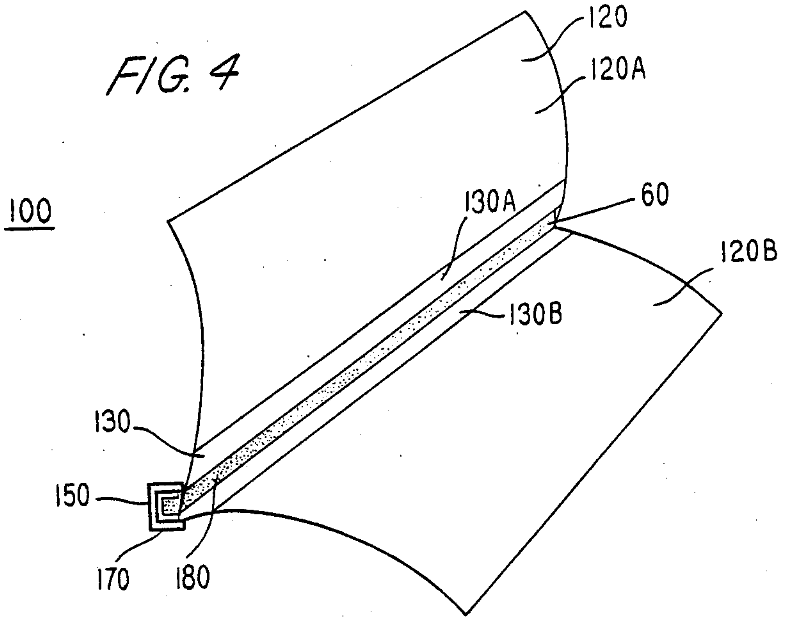
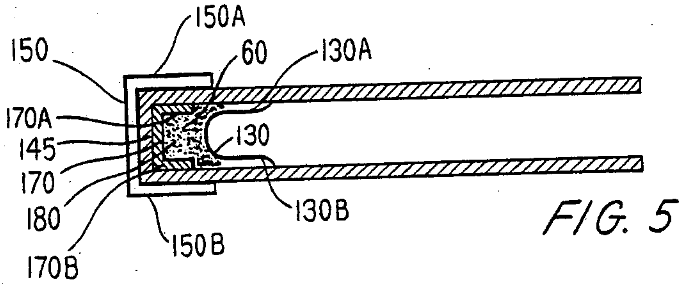
FIG. 5
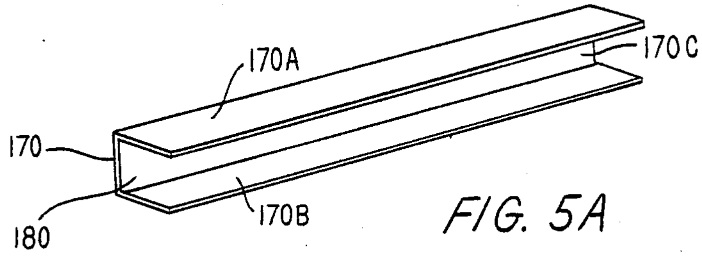
FIG. 5A

FIG. 6
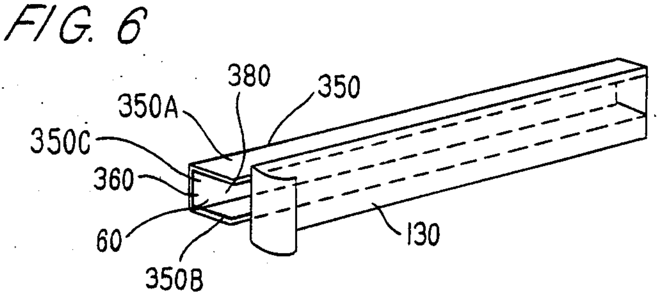
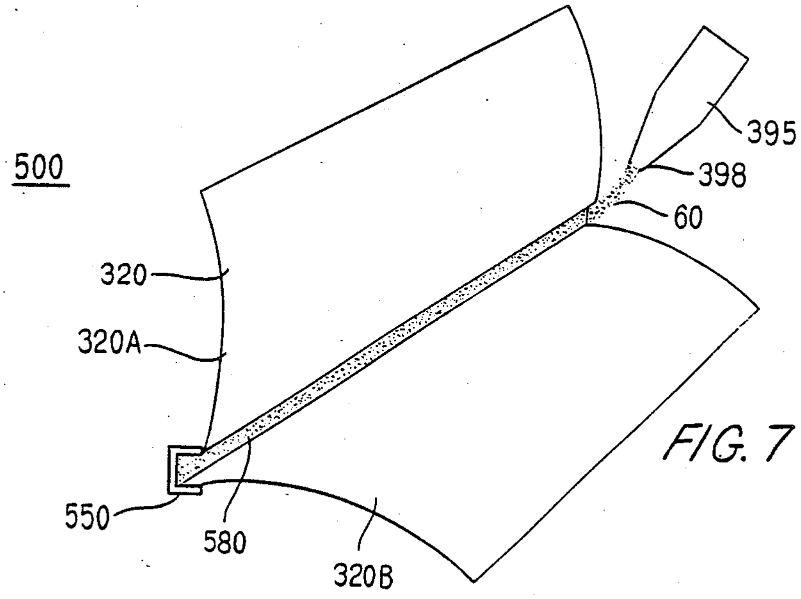
FIG. 7
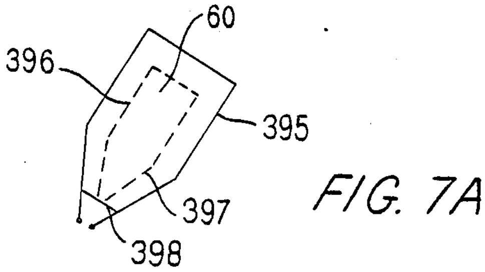
FIG. 7A

BINDABLE COVER FOLDERS

BACKGROUND OF THE INVENTION

1. Field of the Invention

The present invention relates to cover folders for permanently binding sheets of paper and methods for permanently binding sheets of paper to a cover folder or binder spline.

2. Description of the Prior Art

Cover folders for holding sheets of paper are conventionally available in the form of folded sheets of either plastic or paper inserted into a binder spline. The binder spline is commonly an elongated member having a longitudinal slit opening for insertion of a cover and sheets of paper. The cover and paper sheets are held in place by friction. In this type of binder there is typically insufficient friction between the binder and the paper sheets to keep the paper sheets secured in the binder, especially when the cover folder is open. When these folders are opened, the paper sheets tend to slip from the binder if they are pulled with only a small amount of force.

Other prior art cover folders contain fasteners which must be inserted through the binder, cover, and sheets to hold the sheets securely to the folder. The use of such fasteners require that holes be made along the cover edge as well as along at least one edge of the inserted sheets. These holes are undesirable since the sheets tend to tear during normal handling causing the sheets to flip out of alignment with the binder. The use of such fasteners and punched holes in the sheets also detracts from the overall appearance of the cover folder.

Methods of binding sheets of paper in book form, of course, are known and have evolved over the years. These methods typically require the use of threads, staples and other sewing methods in conjunction with the application of glue to the binder in order to keep a number of pages bound in conventional book form. In view of the complexity of such methods, they are not intended for home or office use, but rather are employed by commercial binding manufacturers. There is the need, therefore, for a method that an individual user can employ in order to securely bind a small stack of paper sheets permanently and neatly to a cover folder without resorting to sewing, threading, or use of staples or metal fasteners.

U.S. Pat. No. 4,213,220 discloses a method for binding of books, magazines and the like which eliminates the use of thread, staples and other sewing methods. The method disclosed in this reference relies solely on gluing together individual sheets of paper in order to hold the individual sheets in a magazine or book-like form. In the described method a plurality of spaced notched cuts must first be made along the center fold line of each page to be bound. The notched cuts of each page are somewhat out of alignment so that when the pages are folded along a common fold line overlapping projections of each sheet of paper appear through the notched cuts. That is when the pages are folded along the common fold line, some portions (3) of paper remain visible and slightly project from all or some of the pages along the notched cuts.

When the spine of the book is glued, the glue adheres to each and every one of the spine edge of the pages especially in the projecting parts caused by the notched cuts. This improves the fixing or adhesion of the sheets one to another along the common fold line. It is evident that while eliminating the use of threads, staples and other sewing methods the described method is not designed for home or office use since the cuts or notches on each sheet of paper must be made precisely to a different level, from about ½ to 1 millimeter difference approximately. (Col. 1, lines 34–37.) In addition to the time-consuming step of making such notches, it cannot be reasonably expected that the user could make these cuts to such a fine tolerance without spreading a great deal of time and effort.

U.S. Pat. No. 2,455,971 describes improvements to the then conventional commercial book binding methods. This reference is characteristic of the complex commercial methods for binding sheets of paper in book form and it is evident that such methods involve a number of very precisely regulated steps. It is stated in the reference that the method described therein is expressly for the purpose of complete mechanization, in a continuous manner for the economical fabrication of books. (Col. 4, lines 13–16). This reference therefore is offered as an example of commercial, mechanized continuous book binding methods. It is evident that the method described in this reference involves a sequence of mechanized steps for cutting, aligning and gluing the individual paper sheets 28, together as at 29 and then subsequently glue the sheets to a strip of cotton crash 30. There are a number of steps involved in clamping and unclamping the sheets of paper and realigning the paper as glue is applied to the individual sheets and to the strip of cotton crash 30. The method described in this reference is clearly not intended for home or office use and in addition has the disadvantage that it requires an additional strip of cotton crash 30 to be glued to the individual sheets in order to firmly bind the paper sheets together in book form.

U.S. Pat. No. 1,765,194 discloses a tablet of loose-leaf forms which are bound with adhesive in such a manner that the tablet may be opened without destroying the grouping of the sheets and yet the tablet is designed so that any individual sheets can be readily removed by pulling on it. The individual sheets are bound together by adhesive 10*a* which is applied to an edge of the sheets aligned in a stepped manner as shown best in FIGS. 2 and 5. The alignment of sheets in stepped arrangement allows better adhesive contact between the underside of the adhesive portion of each sheet and the sheet below it. This strengthens the hinge between the sheets and therefore reduces the tendency of the sheets to come apart when the book is opened.

The method described in this patent is not practical for home or office use since the user must expend a considerable time in aligning the individual sheets in a stepped fashion before applying glue to the binding edge of the sheets. The user would typically also have to spend additional effort in binding a cover, for example, cover 14 after the individual sheets have been bound.

U.S. Pat. No. 4,486,032 discloses an improved cover folder with a binder spline which is designed to securely retain a cover and paper sheets inserted therein without the use of external fasteners or adhesive. This folder, while an improvement over cover folders in its class, is not intended as a permanent binder for sheets since the user can readily remove the sheets from the spline and insert a new set of sheets.

Accordingly, it is an object of the present invention to provide a cover folder which can be utilized to quickly and conveniently bind a small stack of paper sheets. A related object is to provide a binder spline which can be utilized to quickly and conveniently permanently bind a small stack of sheets.

Another object of the invention is to provide a method for conveniently binding a stack of sheets to a cover folder or a binder spline such that the sheets will not slip from the cover folder or binder when the sheets are spread open.

SUMMARY OF THE INVENTION

In one aspect of the invention a cover folder is provided with a cover sheet and a binder spline having an elongated channel running along its length. The channel forms a longitudinal opening facing the interior of the folder. The elongated channel is precoated with a book binding adhesive preferably a quick-drying water based adhesive. The adhesive is covered with a removable protective film to prevent premature drying of the adhesive prior to its use. The protective film is secured to the inside edge of the cover folder and tightly covers the adhesive in the elongated channel. When it is desired to use the cover folder, the protective film is simply peeled away to expose the adhesive. The stack of paper sheets to be bound are then aligned along one of its edges and the aligned edge then inserted into the elongated channel in direct contact with the exposed adhesive. The stack of sheets are held in place for the required amount of time until firmly bound in the channel. In one embodiment the cover sheet is composed of two separate plastic or paper sheets and in another embodiment it is composed of one continuous sheet.

In another aspect of the invention, an elongated binder spline is provided which has been precoated with an adhesive, preferably a quick drying, water base adhesive. The binder spline is covered with a removable protective film to prevent the adhesive from drying out while it is kept in storage in the binder spline. When it is desired to permanently secure a stack of sheets the user simply peels the protective film from the binder spline to expose the adhesive contained therein. The user then aligns the paper sheets and inserts them into the adhesive channel of the binder spline and holds the sheets firmly in place until the adhesive sets. In this embodiment the binder spline, precoated with adhesive is made available to the user without a separate cover sheet attached thereto.

In another aspect of the invention, a cover folder with a binder spline having an elongated channel is provided. In this embodiment the channel is not precoated with adhesive but rather the adhesive preferably a quick-drying water base adhesive is made available in a separate dispenser. When it is desired to bind a stack of paper sheets or the like, the user simply dispenses a uniform coating of the adhesive along the length of th elongated channel and then inserts the stack of paper sheets firmly into the channel and holds the sheets in place therein until the adhesive sets.

The present invention has the advantage that the user can quickly and conveniently permanently bind a stack of sheets typically 10 to 60 sheets without use of fasteners, threads, wires or automated commercial book binding methods. The present invention has the additional advantage that it forms a neatly appearing finished product and maintains a stack of paper sheets permanently secured to a binder spline. The individual sheets do not slip out of the binder when the sheets are opened or pulled. Although a number of suitable adhesives could be employed, it has been found desirable to utilize an adhesive which sets quickly, preferably in less than 1 minute when exposed to the environment.

BRIEF DESCRIPTION OF THE DRAWINGS

FIG. 4 is a perspective view of a folder in accordance with another preferred embodiment, showing a binder spline containing adhesive and a folder cover.

FIG. 5 is an end view of the cover folder shown in FIG. 4.

FIG. 5A is a perspective view of the elongated channel member shown in FIGS. 4 and 5.

FIG. 6 is a perspective view of an embodiment of an separate binder spline containing adhesive.

FIG. 7 is a perspective view of another preferred embodiment of the folder cover wherein the binder spline is coated with adhesive by the user.

FIG. 7A is a schematic view of a suitable adhesive dispenser for the embodiment shown in FIG. 7.

DETAILED DESCRIPTION

Figure 1:
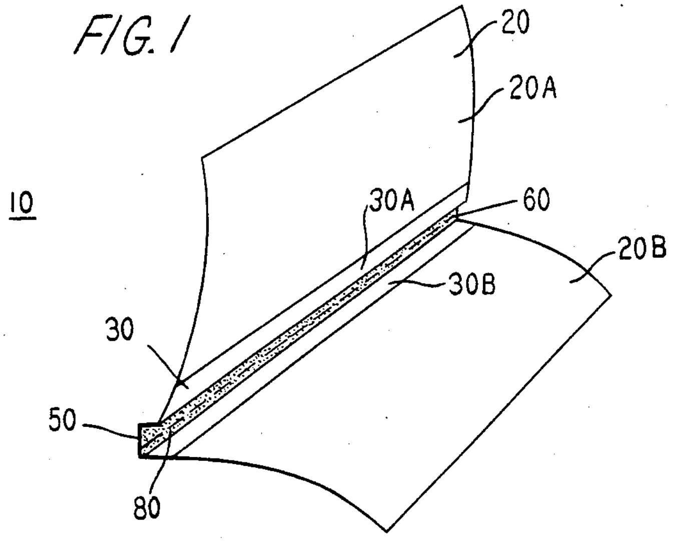
FIG. 1 is a perspective view of a folder in accordance with a preferred embodiment, showing a binder spline containing adhesive and folder cover.
Figure 2:
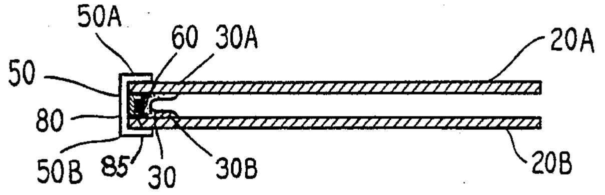
FIG. 2 is an end view of the folder shown in FIG. 1.
Figure 3:
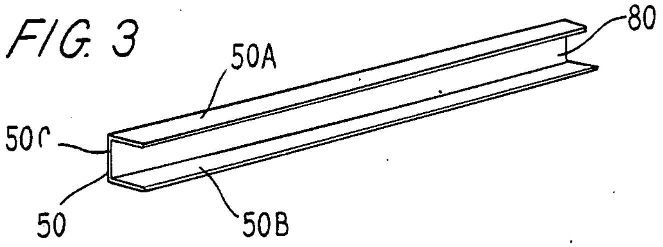
FIG. 3 is a perspective view of the binder spline shown in FIGS. 1 and 2.

Preferred embodiments of the invention are illustrated in FIGS. 1–9. A first preferred embodiment of the bindable cover folder of the invention is illustrated in FIGS. 1 to 3. The bindable cover folder 10 illustrated in FIG. 1 is composed of a cover 20, an elongated binder spline 50 having a channel 80 which contains a quick-setting adhesive 60, and a removable protective film which covers adhesive 60. Binder spline 50 is an elongated rigid member as illustrated in FIG. 3. Binder spline 50 is an elongated rigid member formed of a flat back panel 50 C and flat or substantially flat top and bottom panels 50A and 50B, respectively which emanate from back panel 50C. Top panel 50A and bottom panel 50B are oppositely facing and coextensive. Panel 50A and 50B are preferably parallel. The exposed longitudinal edge of each binder panel 50A and 50B facing into the interior of folder 10 can be beveled or tapered in a direction towards one another. Additionally, panels 50A and 50B can be slanted slightly towards each other in the direction of folder 10.

Binder spline 50 is preferably formed in one step by extruding a suitable thermoplastic material, for example polystyrene, polyethylene, polypropylene, ABS acrylonitrile or butadiene styrene. Panels 50A, 50B and 50C define a channel 80 which runs along the length of spline 50. Channel 80 forms a reservoir for adhesive 60.

It also forms a longitudinal opening facing the interior of folder 10.

The embodiment shown in FIG. 1 is best employed when cover 20 is formed of two separate cover sheets namely a top cover sheet 20A and a bottom cover sheet 20B. These two sheets are separate sheets typically formed of a heavy paper stock. The bindable cover folder 10 is assembled by first gluing or cementing one edge of top cover sheet 20A to the inside surface of top panel 50A of binder spline 50. Likewise the bottom cover sheet 20B is glued or cemented to the inside surface of panel 50B of binder 50.

The binder 50 is preferably polystyrene plastic but may be selected from a wide variety of plastic materials such as ABS acrylonitrile, butadiene styrene, polypropylene and polyethylene. These plastic materials are especially suitable for binder 50 since they are thermoplastic materials which can be readily molded by extrusion to form a relatively inexpensive rigid binder spline 50.

The cover sheets 20A and 20B, typically of paper or a heavy weight paper or cardboard material, as aforestated, may also be of vinyl or plastic material, for example, polyvinylchloride, polypropylene or polystyrene. The invention is not intended to be limited to material of the cover sheet, since a wide variety of paper or plastic material could be employed. Any conventional glue or adhesive may be used for cementing covers 20A and 20B to the inside surface of panels 50A and 50B respectively.

After the cover sheets 20A and 20B have been secured to binder spline 50, a book binding adhesive 60 is applied into channel 80 which runs along the length of the binder spline 50 as best illustrated in FIGS. 1 and 3. After the book binding adhesive 60 is applied to channel 80, it is immediately covered with a removable protective film 30 to protect the adhesive, to keep it from becoming contaminated and to keep it from drying out. The protective film 30 is preferably a plastic film which has a very low moisture vapor transmission rate to best protect the adhesive from drying out prior to use of the cover folder.

A preferred protective film which is essentially impervious to moisture transmission is polyvinylydene chloride.

Another preferred protective film 30 is a polyester film, for example, Mylar polyester film. The film 30 is secured along its edges to the inside surface of top cover sheet 20A and 20B respectively as best shown in FIG. 1. A pressure sensitive adhesive may be employed so that the protective film 30 can be peeled from the inside surface of cover sheets 20A and 20B when it is desired to use the cover folder 10. After the protective film 30 has been secured to the inside cover sheets 20A and 20B the adhesive 60 is completely sealed from the environment and trapped between binder spline 50 and the protective film 30 as best illustrated in FIG. 2. The ends of binder spline 50 are sealed using a separate or same protective film 30, adhesive sealant or regid plastic material.

When it is desired to use cover folder 10, the user simply removes protective film 30 by peeling it away from the cover sheet, thus exposing book binding adhesive 60. A stack of paper sheets which the user wishes to bind into cover folder 10 for example a stack of paper sheets 65 is then simply aligned and inserted into channel 80. Although a variety of conventional book binding adhesives could be employed for adhesive 60, it is preferred to employ a quick-setting adhesive so that the user will not be inconvenienced by an undue waiting time before the adhesive sets and the paper sheets are firmly bound to binder spline 50. Applicant has found that a quick setting water-based permanent adhesive 60 is preferred. Preferably the adhesive should have the property that although water-based it does not degrade or dry out after it has been covered tightly with the protective film 30 and left in storage prior to use of cover folder 10. It preferably must also have the property that allows quick setting in a period of less than about 1 minute when a stack of paper sheets is placed into channel 80 in contact with adhesive 60.

The protective film 30 as aforestated may be simply coated with a conventional removable pressure sensitive adhesive in order to secure it to the inside surface of the top and bottom cover sheets 20A and 20B respectively. It is preferred, however, to first coat the contact areas of the inside surface of cover sheets 20A and 20B with a plastic film such as polyester or polypropylene to provide better adhesive contact between the film 30 and the inside surface of cover sheets 20A and 20B.

Figure 9:
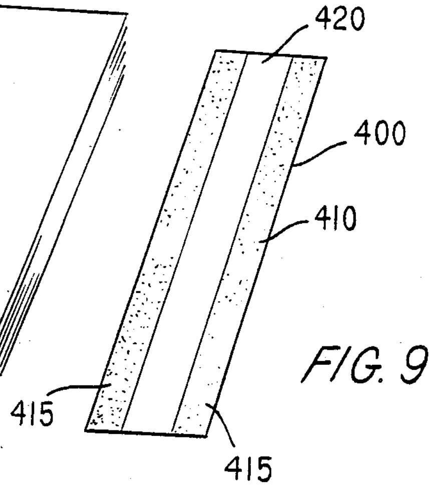
FIG. 9 is a plan view of a preferred removable protective film for the adhesive in FIGS. 1 and 4.

Conventional pressure sensitive adhesives may be employed between film 30 and the inside surface of cover sheets 20A and 20B. A preferred pressure sensitive adhesive may, for example be a rubber or acrylic based pressure sensitive adhesive. An alternative embodiment to the protective film 30 is shown in FIG. 9. In this embodiment protective film substrate 400 may be employed in lieu of film 30. The removable protective film 400 is composed of an outer strip 410 and an inner strip 420. The outer strip is first coated on one side with a pressure sensitive adhesive and the inner strip is applied over it as shown in FIG. 9 exposing pressure sensitive adhesive 415 along opposite edges of the outer strip 410. Inner strip 420 is preferably composed of polyvinylydene chloride and outer strip 410 is typically a polyester film such as Mylar polyester film. In this embodiment the inner strip 420 contacts and covers adhesive 60 when the protective film substrate 400 is applied to the inside of cover sheets 20A and 20B in manner similar to that of protective film 30. To make the outer strip 410 more easily peelable from the cover sheet, the contact areas of cover sheets 20A and 20B may be coated with a thin film of polyester material. Such a coating provides a greater adhesion between the protective film outer strip 410 with the cover sheets 20A and 20B and also makes it easier for the user to remove the protective film 400 when it is desired to expose adhesive 60 just prior to use of the cover folder.

Another preferred embodiment of the bindable cover folder of the invention is illustrated in FIGS. 4 and 5. In the embodiment shown in these figures, the cover folder 100 is composed of a rigid elongated binder spline 150, cover sheet 120, a rigid elongated channel 170, book binding adhesive 60 applied to channel 170 and a removable protective film 130 which covers and protects adhesive 60. In the embodiment shown in FIG. 4, cover sheet 120 is formed of a continuous sheet. A wide variety of materials is suitable for cover sheet 120. For example, sheet 120 may be a continuous sheet of paper, preferably heavy weight paper or thin cardboard material. Alternatively, continuous sheet 120 may be formed of common plastic film such as polyvinylchloride, polystyrene, polyethylene or polypropylene plastic.

The bindable cover folder 100 is assembled by first folding cover sheet 120 so that it forms a top cover sheet 120A and a bottom cover sheet 120B having a common fold edge 145. Binder spline 150 is of the same preferred shape and form as binder spline 50 shown in FIG. 3. Cover sheet 120 is glued or cemented to the three inside surfaces of binder spline 150. A second rigid elongated channel member 170 is then inserted into the elongated fold formed between cover sheets 120A and 120B as best shown in FIG. 5. Channel member 170 is an elongated rigid member formed of a flat back panel 170C and a top and bottom flat panel 170A and 170B, respectively which are oppositely facing and coextensive as shown in FIG. 5A. Panels 170A and 170B are preferably parallel. Panels 170A, 170B and 170C define a channel space 180 having an opening facing the interior of cover folder 100. The elongated channel member 170 is essentially of the same shape structure and length and of the same material as member 150 except that it is smaller in width and depth. Thus, member 170 fits snugly against fold 145 within the bounds of panels 150, 150A and 150B.

A preferred channel member 170 is shown in FIG. 5A. Elongated channel member 170 is secured into the fold area between sheets 120A and 120B and is glued or cemented to the cover sheet 120 in the fold area thereof as shown in FIGS. 4 and 5. Thus, top surface 170A of channel member 170 is glued to sheet 120A; bottom surface 170B is glued to bottom cover sheet 120B and the back surface 170C of channel 170 is glued to the fold 145 of cover sheet 120. After channel 170 is secured in the manner described, the book binding adhesive 60 is applied to channel space 180. The adhesive 60 is preferably applied evenly along the length of channel space 180 and thereafter immediately covered by affixing protective film 130 over it.

Protective film 400 as shown in FIG. 9 may be used in place of protective film 130. The elongated rigid member 170 is employed in the embodiment shown in FIG. 4 since it provides a barrier between adhesive 60 and fold 145 of cover sheet 120. This barrier prevents the adhesive 60 from corroding fold 145 or from becoming absorbed therein. Member 170 also forms the channel space 180 for receiving and holding a stack of paper sheets. The ends of binder spline 150 are sealed using a separate or same protective film 130 or rigid plastic material.

Figure 8:
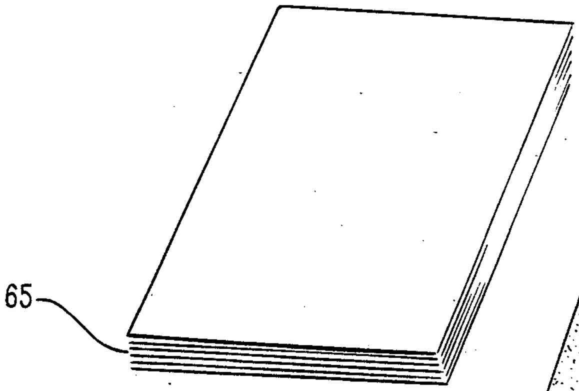
FIG. 8 is a perspective view of a stack of paper sheets for insertion into the various preferred cover folder embodiments.

When it is desired to use the cover folder 100, the user simply peels away protective film 130 in order to expose adhesive 60. A stack of paper sheets, for example a stack of sheets 65 shown in FIG. 8, is then inserted into channel 180 and firmly pressed into the channel and firmly held in place until adhesive 60 sets and securely bonds the stack of paper sheets to the binder spline. Member 170 must adhere to the inside of cover sheet 120 employing conventional adhesives, and must also adhere to book binding adhesive 60. A preferred plastic for channel member 170 has been determined to be polystyrene or polyvinylchloride. The binding spline 150 is conveniently of the same material as member 170.

The embodiment shown in FIG. 4 can be modified to eliminate channel member 170 by employing in its place a nonabsorbent plastic film. The film must have the property that it provides an effective barrier between adhesive 60 and fold 145 and effectively keeps the adhesive from becoming absorbed into fold 145 of cover sheet 120. The film must also have the property that it readily adheres to the adhesive 60. Preferred film which has been proved to have these required properties and which may be employed in place of member 170, have been determined to be polystyrene, polyester, polyvinylchloride or polypropylene film.

Another embodiment of the bindable cover folder of the present invention is illustrated in FIG. 6. In this embodiment a binder spline 360 is pre-filled with book binding adhesive 60 and covered with a removable protective film 130. As illustrated in FIG. 6, binder spline 360 is of the same preferred shape as that of spline 50 shown in FIG. 3. It is thus of rectangular shape formed by three flat panels, 350A, 350B and 350C which define an elongated channel 380 for adhesive 60. The spline 360 filled with adhesive can be made available to the consumer in the form shown in FIG. 6. In use the consumer simply removes protective sheet 130 from spline 360 to expose the adhesive 60 contained therein. The user then need only align and insert an stack of paper sheets, for example, the stack of sheets 65 shown in FIG. 8 into channel 380 and to hold the stack firmly in place until the adhesive 60 sets and binds the paper sheets 65 to spline 360.

Figure 11:
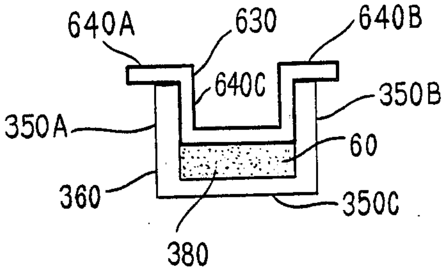
FIG. 11 is an end view of the binder of the type in FIG. 6 and illustrates a rigid elongated member to protect the adhesive.

The protective film 130 may be replaced with a rigid elongated protective member 630 as shown in FIG. 11. Protective member 630 has a trough portion 640C which is designed to fit snugly into channel space 380 along the length of binder 360. Member 360 thus provides a tight cover for adhesive 60 and thus prevents adhesive 60 from degrading or dehumidifying prior to use. Member 630 is designed to fit snugly in channel space 380 along the length of binder 360 but it is also removable from the binder. Member 630 is provided with lips 640A and 640B which extend over the edge of spline 360 as shown in FIG. 11. Thus, member 630 can be readily removed from channel space 380 by grasping lips 640A and 640B and simply pulling member 630 out of channel 380 to expose adhesive 60.

Figure 12:
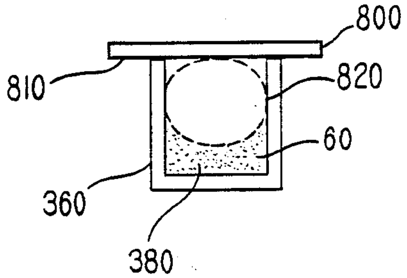
FIG. 12 is an end view of the binder of the type in FIG. 6 and illustrates another embodiment of a rigid elongated member to protect the adhesive.

Another preferred design for the elongated protective member is shown in FIG. 12. In this embodiment the elongated rigid protective member 800 is composed of a flat panel 810 and cylindrical structure 820 connected to panel 800. Member 800 is designed so that the cylindrical portion 820 fits snugly along the length of channel space 380. Cylindrical structure 820, thus provides a tight cover for adhesive 60 and prevents adhesive 60 from degrading or dehumidifying prior to use. Protective member 800 can be readily removed by grasping overhanging panel 810 and lifting member 800 out of channel 380 thereby exposing adhesive 60. The user then need only align and insert a stack of paper sheets into channel 380 (FIGS. 11 and 12) and to hold the stack firmly in place until the adhesive 60 sets. The ends of binder 360 may conveniently be sealed with an adhesive film tape adhesive sealant or rigid plastic material 85.

Another embodiment of the bindable cover folder of the invention is shown in FIG. 7. In this embodiment cover folder 500 as illustrated in FIG. 7 is composed of a rigid elongated binder spline 550 to which is secured a cover sheet 320. Binder 550 essentially has the same structure as spline 50 and forms a channel 580 analogous to channel 80. The cover sheet 320 may typically be formed of two separate sheets 320A and 320B in order to form a folder analogous to that of folder 10 shown in FIG. 1. However, folder 500 illustrated in FIG. 7 is not precoated with the book binding adhesive 60 in spline 550. Rather the book binding adhesive 60 can be made separately available in a suitable dispenser 395 as illustrated schematically in FIG. 7. Since book binding adhesive 60 is available in a liquid, any suitable dispenser for dispensing liquid adhesive may be utilized for dispenser 395. The principal requirement of course is that the dispenser be tightly capped so that the adhesive would not dry out in dispenser 395.

Another requirement is that the dispenser 395 be provided with a suitable nozzle 398 which would allow dispensing of the adhesive in uniform flow. Thus, when the user desires to utilize the bindable cover folder 500 he or she need simply open cover sheet 320 to expose channel 580 and then simply dispense adhesive 60 from dispenser 395 evenly throughout the elongated channel 580. Immediately thereupon a stack of paper sheets, for example stack 65, may be inserted into channel 580 and firmly held in place until the adhesive sets and binds the stack of sheets to spline 550.

An alternative dispenser for 395 could also be a conventional sealed foil pocket type applicator such as that shown, for example, in FIG. 7A. The sealed foil applicator 395 may be provided with an internal pouch 396 for storing adhesive 60. The pouch 396 could terminate in nozzle shape 397. Foil pack dispenser 395 could simply be cut along the line 398 just prior to use and the adhesive 60 could then simply be manually squeezed from pouch 396 through nozzle 397 and applied thereby to channel 580. The dispenser embodiment of FIG. 7A for adhesive 60 is illustrative of one specific type of dispenser which could be employed for storing and dispensing adhesive 60.

As aforestated other conventional dispensers for storing and dispensing liquid adhesive are also suitable and the present invention is not intended to be limited to the dispenser shown in FIG. 7A.

Figure 10:
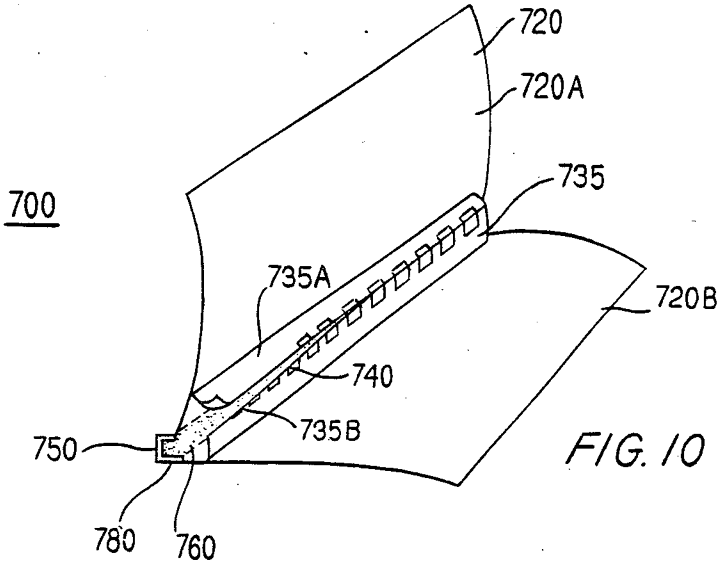
FIG. 10 is a perspective view of another preferred cover folder having a binder spline with a sealed pouch prefilled with adhesive.

Another embodiment of the invention is illustrated in FIG. 10. In this embodiment the bindable cover folder is composed of cover sheet 720 which is glued to elongated binder spline 750. Elongated binder spline 750 has an elongated channel 780 which runs along its length. Thus, binder cover 700 is similar to binder cover 10 illustrated in FIG. 1 in that binder spline 750 is analogous to spline 50 of FIG. 1 and the cover sheet 720 is analogous to cover sheet 20. In the embodiment illustrated in FIG. 10, however, the adhesive 60 is not precoated along the length of channel 780 of the spline 750 but rather is contained in a closed pouch 735. Thus, in manufacture the adhesive is predispensed into a pouch 735 and the pouch is then inserted into channel 780 and glued to the inside of cover sheet 720 along the binder spline 750 as illustrated in FIG. 10.

When it is desired to use cover folder 700 the user simply opens cover sheet 720. As the top cover sheet 720A separates from the bottom cover sheet 720B, pouch 735 splits open along a seam line 740. As pouch 735 splits along seam line 740, the adhesive 760 contained in the pouch then becomes exposed to the environment. The user then need only insert a stack of paper sheets, for example stack 65, into the opened pouch 735 so that one edge of the sheets 65 is in direct contact with adhesive 760. The stack of sheets 65 is held firmly in place against adhesive 760 until the adhesive sets. In this manner a stack of paper sheets can be firmly and neatly bound within cover folder 700.

Pouch 735 can be formed from a variety of plastic materials, for example, such as polystyrene, polyester, polyethylene (low, high or medium density) polyvinylchloride film and polypropylene film. A preferred pouch 735, however, is composed of polyvinylydene or a polyester film such as a Mylar polyester. These latter films have very low moisture vapor transmission rates and have the required durability and flexibility making them very suitable materials for the pouch.

In manufacture the pouch is prescored to allow for its easy opening along score line 740 when the user opens cover folder 720. Pouch 735 protects adhesive 760 from degrading or drying out prior to use since it tightly seals the adhesive from the surrounding environment. The pouch can be made of conventional thickness, for example ½ mil to about 2 to 3 mil wall thickness employing polyvinylydene chloride or polyester film which has been proved to prevent escape of moisture from adhesive 760. It prevents degradation and dehydration of adhesive 760 even if the cover folder 700 is left in storage for as long as two years.

Although a variety of book binding adhesives 760 are known and could be employed in pouch 735, it is desirable to utilize a quick-setting water base adhesive which has the property that it quickly sets in less than about a minute when it contacts a stack of paper sheets while exposed to the environment. The so called quick drying adhesives are most preferred since they reduce the time the user must hold the stack of paper sheets 65 in contact therewith. Thus, although a variety of adhesives can be used in pouch 765 which have a longer setting time, it is preferrable to use a quick drying water based adhesive which has a setting time of less than about 1 minute.

A preferred adhesive for the adhesive 60, 360 and 760 in the aforementioned embodiment of the invention is a quick drying polyurethane water based adhesive. This preferred adhesive has the property that it sets in less than about 1 minute typically within about 30 to 40 seconds when simultaneously exposed to the environment and applied to an edge of a stack of paper sheets. The adhesive has the property that it provides a very strong bond which holds the stack of sheets, typically 15 to 60 sheets of paper firmly and permanently bonded to the binder spline or cover folder of the type shown in FIGS. 1 to 10.

A preferred polyurethane water based quick drying adhesive for use in the present invention has the component formulation shown in Table I.

TABLE I

| | Polyurethane Adhesive Component Formulation | Per Cent By Weight |
|---|---|---|
| a. | aliphatic diisocyanate (e.g., isophorone diisocyanate from Huls Corporation.) | 5.8 |
| b. | poly(propylene oxide) macroglycol (e.g., 2000 MW poly(propylene oxide macroglycol available from Union Carbide Corp. under the tradename NIAX PPG 2025 macroglycol) | 19.4 |
| c. | acid functional diol (e.g., dimethylolpropionic acid available from the IMC division of Pitman-Moore Co.) | 1.0 |
| d. | aliphatic diamine chain extender (e.g., ethylene diamine) | 0.4 |
| e. | organotin catalyst (e.g., stannous octoate catalyst available under the tradename T-9 catalyst from Air Products Co.) | 0.005 |
| f. | tertiary amine counterion (e.g., triethylamine) | 0.8 |
| g. | low M.W. resinous component alcohol soluble (e.g., styrene allyl alcohol | 13.3 |

TABLE I-continued

| Polyurethane Adhesive Component Formulation | | Per Cent By Weight |
|---|---|---|
| | resin available under the tradename RJ-100 from Monsanto Corp.) | |
| h. | deionized water | 45.9 |
| i. | alcohol (e.g., isopropanol | 13.3 |
| | | 100.0 |

The polyurethane water based adhesive having the component formulation shown in Table I may be prepared in the following three stages:

1. Prepolymer Formation

The macroglycol (b), acid-functional diol (c), and the diisocyanate (a) (the diisocyanate in stoichiometric excess) are intially coreacted in the presence of the stannous octoate catalyst (e) at reaction temperature.

The acid groups of the acid functional diol are believed to be preserved throughout this reaction.

2. Coemulsification of Isocyanate—Functional Prepolymer and Low MW Resinous Compound The prepolymer product of step (1) is blended at ambient temperatures with the stated amount of the low MW resinous compound (g) which was previously dissolved in isopropanol.

The blend is further introduced to an agitating mixture of deionized water (h) and triethylamine at ambient temperature. A smooth low particle size emulsion is rapidly formed during agitation.

3. Chain-Extension of Emulsified Prepolymer

Immediately after a complete and uniform emulsion is formed in step (2), the percent by weight shown in Table I of the aliphatic diamine (d) is added to the aqueous system. This causes rapid reaction which forms urea linkage within the formed polyurethane polymer particles resulting in the production of the quick drying polyurethane water based adhesive for use in the bindable cover folders of the present invention. This adhesive sets in less than about one minute when exposed to the environment in contact with a stack of paper sheets.

Although the various binder embodiments have been described without reference to binder size, it should be appreciated that the binder embodiment described herein can be sized to hold different size stacks of paper sheets ranging typically, from 10 to 60 sheets. It has been found conventional, for example, to have three sizes, one capable of holding 10 to 20 sheets, another capable of holding 20 to 40 sheets and another capable of holding 40 to 60 sheets.

Although the invention has been described with reference to preferred embodiments for the cover folder, it should be appreciated that other embodiments for the cover folder are possible without departing from the concept of the present invention. It is not intended therefore that the invention be limited to the preferred embodiments described herein but rather the invention is defined by the claims and equivalents thereof.

What is claimed is:

1. A folder for permanently binding a stack of paper sheets comprising, a binder spline comprising an elongated rigid member having a channel running along its length, said elongated member comprising a flat back panel and two oppositely facing coextensive panels emanating from said back panel, said back panel and oppositely facing panels defining said channel, a cover sheet affixed to the elongated rigid member, and a closed pouch containing a book binding adhesive therein, said pouch affixed to the elongated member and contained within and along the length of said channel, means for opening the pouch along its length to expose the adhesive contained therein, whereupon a stack of paper sheets can then be inserted into the channel so that an aligned edge of the stack of paper sheets is in direct contact with the adhesive and said stack of paper sheets thence becomes permanently bound to said binder spline.

2. A folder for permanently binding a stack of sheets as in claim 1 wherein said means for opening the pouch is a scored line running along the length of the pouch wherein as the cover folder is opened the pulling force exerted transversely on the pouch causes the pouch to split open along said score line.

* * * * *